United States Patent
Norisue et al.

(10) Patent No.: US 6,805,921 B2
(45) Date of Patent: Oct. 19, 2004

(54) OPTICALLY ACTIVE COMPOUND AND NEMATIC LIQUID CRYSTAL COMPOSITION CONTAINING THE COMPOUND

(75) Inventors: Yasumasa Norisue, Tokyo (JP); Yuki Motoyama, Tokyo (JP); Masahiro Johno, Tokyo (JP)

(73) Assignee: Mitsubishi Gas Chemical Co., Inc., Tokyo (JP)

( * ) Notice: Subject to any disclaimer, the term of this patent is extended or adjusted under 35 U.S.C. 154(b) by 91 days.

(21) Appl. No.: 10/212,230

(22) Filed: Aug. 6, 2002

(65) Prior Publication Data

US 2003/0102459 A1 Jun. 5, 2003

(30) Foreign Application Priority Data

Aug. 9, 2001 (JP) .......................... 2001-241846
Sep. 10, 2001 (JP) .......................... 2001-273768

(51) Int. Cl.$^7$ .................. C09K 19/20; C09K 19/46; C09K 19/58; C07C 69/76
(52) U.S. Cl. .............. 428/1.1; 252/299.64; 252/299.67; 560/76; 560/85
(58) Field of Search ................. 252/299.64, 299.67; 428/1.1; 560/56, 76, 85

(56) References Cited

U.S. PATENT DOCUMENTS

| | | |
|---|---|---|
| 4,754,051 A | 6/1988 | Sasaki et al. |
| 4,764,636 A | 8/1988 | Sasaki et al. |
| 5,656,198 A | 8/1997 | Naito et al. |

FOREIGN PATENT DOCUMENTS

| | | |
|---|---|---|
| EP | 0-217354 A1 | 4/1987 |
| EP | 0-309774 A2 | 4/1989 |
| EP | 0-345013 A2 | 12/1989 |
| EP | 0-776958 A1 | 6/1997 |
| JP | 62-161746 | 7/1987 |
| JP | 02-004893 | 1/1990 |
| JP | 63-284147 | 11/1998 |
| JP | 2000-169851 | 6/2000 |
| WO | WO- 96/30462 | 10/1996 |

OTHER PUBLICATIONS

CAPLUS 1998:299190.*
Nakauchi, et al. "Ferroelectric Liquid Crystal Mixtures Doped with Compounds Having Chiral Groups at Both Ends of the Core", 362 Japanese Journal of Applied Physics/Part 2, 28 (1989) Feb., Tokyo, Japan.
Murashiro, et al. "Dopant Effect on Threshold Electric Field of Antiferroelectric Liquid Crystal Switching", Liquid Crystals, (1993), vol. 14, No. 2, pp371–380, London, GB.

* cited by examiner

*Primary Examiner*—Shean C. Wu
(74) *Attorney, Agent, or Firm*—Sherman & Shalloway

(57) ABSTRACT

An optically active compound of the following general formula (1),

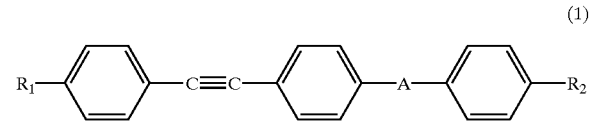

(1)

wherein A is —C≡C— or —COO—, each of $R_1$ and $R_2$ is independently $C_nH_{2n+1}$—, $(C_2H_5)_2CHCH_2C^*H(CH_3)OOC$—, $C_mH_{2m+1}C^*H(CH_3)OOC$— or $C_6H_5C^*H(CH_3)OOC$— in which n is an integer of 2 to 5, m is an integer of 5 to 9, $C_6H_5$— is phenyl group, and $C^*$ is an asymmetric carbon, provided that there is no case where $R_1$ and $R_2$ are together $C_nH_{2n+1}$— or $C_6H_5C^*H(CH_3)OOC$— and that when both $R_1$ and $R_2$ are $C_mH_{2m+1}C^*H(CH_3)OOC$—, m in $C_mH_{2m+1}C^*H(CH_3)OOC$— represented by $R_1$ and m in $C_mH_{2m+1}C^*H(CH_3)OOC$— represented by $R_2$ may be different integers.

The optically active compound of the present invention is excellently valuable as a chiral dopant since it has properties that its helical twisting power (HTP) is at least 9, that a helical pitch induced decreases with an increase in temperature and further that its birefringence (Δn) is large.

13 Claims, 1 Drawing Sheet

OPTICALLY ACTIVE COMPOUND AND NEMATIC LIQUID CRYSTAL COMPOSITION CONTAINING THE COMPOUND

DETAILED DESCRIPTION OF THE INVENTION

1. Field of the Invention

The present invention relates to a novel optically active compound useful as a chiral dopant and a liquid crystal composition containing the compound, and also relates to a liquid crystal display device to which the liquid crystal composition is applied.

More specifically, it relates to a chiral dopant that has a helical twisting power (HTP) of at least 9 and exhibits a property that a helical pitch induced by the chiral dopant decreases with an increase in temperature and which also has a large birefringence value, and use thereof.

2. Prior Art of the Invention

Various modes are known as display modes of liquid crystal display devices, and in most of such display modes, it is required to control the helical pitch of a liquid crystal. The mode that requires control of the helical pitch of a liquid crystal includes the following modes.

The modes that have been put to practical use and widely employed are a twisted nematic mode (TN mode) and a super twisted nematic mode (STN mode) using a nematic liquid crystal.

In the TN mode, liquid crystal molecules are aligned so as to twist at 90 degrees between an upper substrate and a lower substrate, and a ¼ pitch of a helix is formed in a cell.

In the STN mode, liquid crystal molecules are aligned so as to twist at approximately 220 degrees between an upper substrate and a lower substrate, and an approximately ⅗ pitch of a helix is formed in a cell.

The TN mode is employed in a simple matrix driving liquid crystal display device and an active matrix driving liquid crystal display device, and the STN mode is employed in a simple matrix driving liquid crystal display device.

BRIEF DESCRIPTION OF DRAWINGS

There is also a selective reflection (SR) mode of a chiral nematic liquid crystal as another mode in addition to the above TN mode and STN mode. As shown in FIGS. 1 and 2, in the SR mode, a liquid crystal has a planar state in which helical axes are perpendicular to substrates (FIG. 1) and a focal-conic state in which directions of helical axes are at random (FIG. 2). These two states are switched from one to the other with voltage pulse. In the planar state, light having a wavelength corresponding to a helical pitch is reflected, and in the focal-conic state, light is transmitted through a device. When a reflection state is used as "bright" and when a transmission state is used as "dark", a display can be realized.

Figure 1:
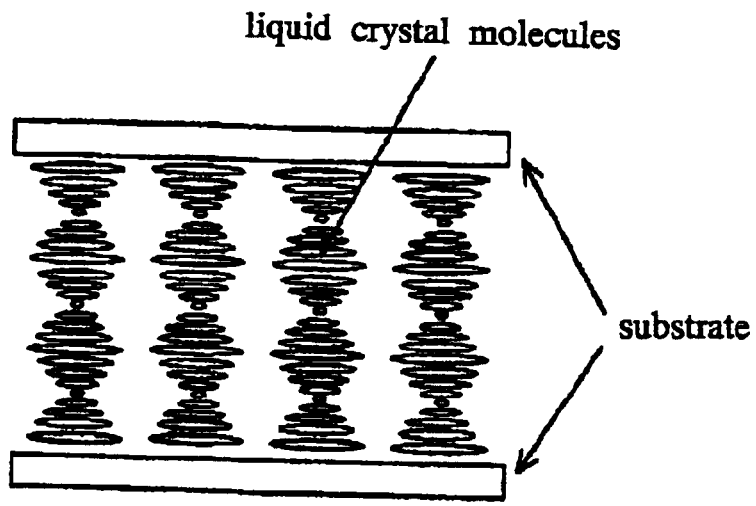
FIG. 1 schematically shows a planar alignment of a chiral nematic liquid crystal.
Figure 2:
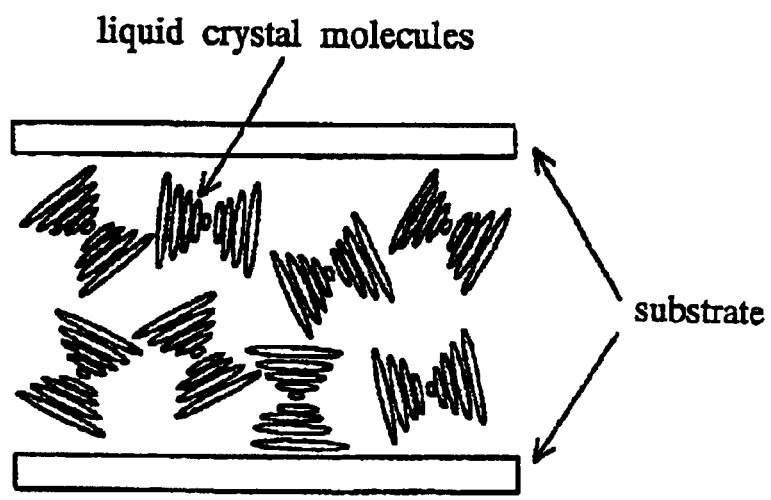
FIG. 2 schematically shows a focal-conic alignment of a chiral nematic liquid crystal.

In the present specification, "liquid crystal" refers to a composition containing a mixture of a plurality of liquid crystal compounds unless it is specified to be any specific compounds. Further, "chiral dopant" refers to an optical active compound that induces a helical structure or a mixture containing such a compound. Further, "base liquid crystal" refers to a nematic liquid crystal that does not contain a chiral dopant.

As is already described, an optically active compound that induces a helical structure is generally called "chiral dopant". Many chiral dopants have been synthesized, and typical compounds thereof are compounds having the following structures.

Name                  Structural formula

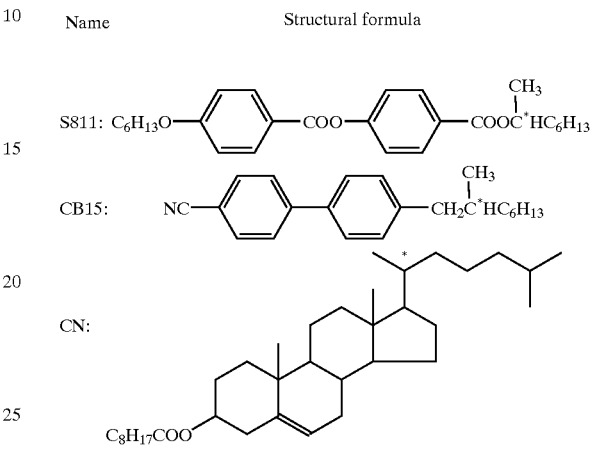

The most essential performance that is required of a chiral dopant compound is to have large helical twisting power. The helical twisting power (HTP) refers to a physical quantity defined by the following expression.

$$HTP(\mu m^{-1})=1/(\text{amount of chiral dopant added (wt \%)}/100 \times \text{induced helical pitch } (\mu m))$$

Generally, chiral dopants themselves exhibit no liquid crystallinity, and most of them have large molecular weights. When a large amount of a chiral dopant is added to a base liquid crystal, it degrades various performances in many cases. The degradation of the performances includes a decrease in temperature for phase transition from an isotropic phase to a nematic phase, an increase in viscosity of a liquid crystal and an easy occurrence of crystallization. A chiral dopant having large helical twisting power serves to prevent the degradation of the various performances since a desired helical pitch can be obtained by adding a small amount of such a chiral dopant to the base liquid crystal.

In addition to the above problems, the SR mode further has problems on dependency of the helical pitch upon temperatures, the color purity of reflected light and the intensity of reflected light. In the SR mode, a liquid crystal reflects (selectively reflects) light corresponding to a helical pitch to produce a bright state. In this case, a maximum selective reflection takes place at the following wavelength $\lambda_0$.

$$\lambda_0 = n_{AV} \cdot p \qquad (a)$$

wherein p is a helical pitch, and $n_{AV}$ is an average refractive index in a plane that is perpendicular to a helical axis.

Further, a wavelength band width (a half width of reflected light spectrum) Δλ in this case is represented by $$\Delta\lambda = \Delta n \cdot p \qquad (b)$$

in which Δn is a birefringence of a liquid crystal material.

Chiral dopants that have been already developed have a problem that the helical pitch thereof increases in length with an increase in temperature, so that reflected light shifts toward light on a long wavelength side. A change in wavelength of selectively reflected light with an increase in temperature will be referred to as "wavelength shift". An increase in wavelength of selectively reflected light caused by an increase in temperature is defined to be plus wavelength shift, and a decrease in wavelength of selectively reflected light is defined to be minus wavelength shift.

For removing the dependency of wavelength of selectively reflected light upon temperatures, it has been attempted to combine a chiral dopant that shows a plus wavelength shift and a chiral dopant that shows a minus wavelength shift. However, there are very few chiral dopants that have large helical twisting power (HTP) and show a minus wavelength shift, and further, the amount of the shift that can be achieved is too small, so that none of conventional chiral dopants are fully satisfactory if any.

With respect of the color purity and intensity of reflected light, as shown by the above expression (b), when a liquid crystal material has a small birefringence, the wavelength band width of reflected light is small, so that the color purity improves. Since, however, only light having specific wavelengths is reflected, the intensity of reflected light is low.

When a liquid crystal material has a large birefringence, the wavelength band width of reflected light is large, and the color purity thereof is low. However, light in a broad wavelength is reflected, so that the intensity of reflected light is high.

In chiral nematic liquid crystal compositions, therefore, it is attempted to optimize the birefringence thereof by tacking account of the color purity and intensity of reflected light.

However, the birefringence has been taken account of when almost no chiral dopants have been developed, and most of chiral dopants developed deteriorate the birefringence of a base liquid crystal. When a chiral dopant having a large birefringence and a chiral dopant having a small birefringence are used in combination so that the birefringence values of the chiral dopants and the birefringence of a base liquid crystal are brought into a consistent state, the deterioration of birefringence of the base liquid crystal can be prevented. However, almost no chiral dopant having a large birefringence has been developed so far, and the above measures cannot be suitably taken.

Problems to be Solved by the Invention

It is an object of the present invention to provide a chiral dopant having properties that its helical twisting power is large, that a helical pitch induced by the chiral dopant decreases with an increase in temperature and further that its birefringence value is large.

Means to Solve the Problems

According to the present invention, there is therefore provided an optically active compound of the following general formula (1) useful as a chiral dopant, (1)

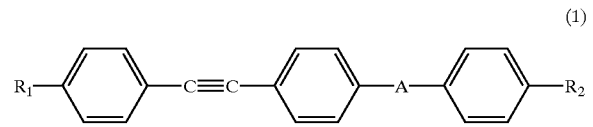

wherein A is —C≡C— or —COO—, each of $R_1$ and $R_2$ is independently $C_nH_{2n+1}$—, $(C_2H_5)_2CHCH_2C^*H(CH_3)OOC$—, $C_mH_{2m+1}C^*H(CH_3)OOC$— or $C_6H_5C^*H(CH_3)OOC$— in which n is an integer of 2 to 5, m is an integer of 5 to 9, $C_6H_5$— is phenyl group, and C* is an asymmetric carbon.

However, there is no case where $R_1$ and $R_2$ are together $C_nH_{2n+1}$— or $C_6H_5C^*H(CH_3)OOC$—. Further, when both $R_1$ and $R_2$ are $C_mH_{2m+1}C^*H(CH_3)OOC$—, m in $C_mH_{2m+1}C^*H(CH_3)OOC$— represented by $R_1$ and m in $C_mH_{2m+1}C^*H(CH_3)OOC$— represented by $R_2$ may be different integers.

In the definitions of $R_1$ and $R_2$, both alkyl groups represented by $C_nH_{2n+1}$ and $C_mH_{2m+1}$ are linear alkyl groups.

Since the optically active compound of the above general formula (1) has properties that its helical twisting power is large, that a helical pitch induced by the chiral dopant decreases with an increase in temperature and further that its birefringence value is large, so that it is useful as a chiral dopant. The optically active compound of the present invention can be accordingly used as an additive to a nematic liquid crystal. That is, the above optically active compound is used as a component for a nematic liquid crystal composition. The optically active compound of the general formula (1) includes various compounds depending upon definitions of $R_1$, $R_2$, and the like, and at least one of such compounds is used.

The optically active compound of the present invention has the above general formula (1) and is classified into the following preferred compound groups (a) to (e).

(a) Optically active compound of the general formula (1) in which one of $R_1$ and $R_2$ is $C_nH_{2n+1}$— and the other is $(C_2H_5)_2CHCH_2C^*H(CH_3)OOC$— or $C_mH_{2m+1}C^*H(CH_3)OOC$—.

(b) Optically active compound of the general formula (1) in which $R_1$ is $C_nH_{2n+1}$— and $R_2$ is $(C_2H_5)_2CHCH_2C^*H(CH_3)OOC$— or $C_mH_{2m+1}C^*H(CH_3)OOC$—.

(c) Optically active compound of the general formula (1) in which $R_1$ and $R_2$ are together $(C_2H_5)_2CHCH_2C^*H(CH_3)OOC$—.

(d) Optically active compound of the general formula (1) in which $R_1$ and $R_2$ are together $C_mH_{2m+1}C^*H(CH_3)OOC$—.

In the above optically active compound, more preferably, A is —C≡C—, and still more preferably, m in $C_mH_{2m+1}C^*H(CH_3)OOC$— represented by $R_1$ and m in $C_mH_{2m+1}C^*H(CH_3)OOC$— represented by $R_2$ are together 5 or 7.

(e) Optically active compound of the general formula (1) in which one of $R_1$ and $R_2$ is $C_6H_5C^*H(CH_3)OOC$— and the other is $(C_2H_5)_2CHCH_2C^*H(CH_3)OOC$— or $C_mH_{2m+1}C^*H(CH_3)OOC$—.

In the above optically active compound, more preferably, A is —C≡C—.

In a preferred embodiment of the present invention, the optically active compound of the present invention has properties that its helical twisting power (HTP) of at least 9, more preferably at least 13, and that the helical pitch induced decreases with an increase in temperature. Further, the birefringence (An) of the optically active compound of the present invention is at least 0.16, suitably at least 0.20.

The optically active compound of the present invention therefore has excellent properties as an additive to a nematic liquid crystal, i.e., as a chiral dopant. Therefore, at least one of compounds of the present invention, represented by the general formula (1), is added to a nematic liquid crystal, and the resultant liquid crystal composition is advantageously used as a nematic liquid crystal composition. The nematic liquid crystal composition is interposed between substrates having electrodes, and the thus-prepared component is used as a liquid crystal device.

The optically active compound of the present invention includes two types of compounds, one type containing one asymmetric carbon and the other type containing two asymmetric carbons. The optically active compound containing one asymmetric carbon includes two types of isomers, R-configuration compounds and S-configuration compounds. The R-configuration compound and the S-configuration compound differ in twisting direction (right-handed twisting or left-handed twisting) of the helical structure induced. The optically active compound having two asymmetric carbons includes four types of isomers, R—R configuration compound, R—S configuration compound, S—R configuration compound and S—S configuration compound. R—R configuration compound and S—S configuration compound are preferred. The R—R configuration compound and S—S configuration compound also differ in twisting direction (right-handed twisting or left-handed twisting) of the helical structure induced. When used, the twisting directions of these optically active compounds are taken account of for selection of these compounds.

Further, when a large amount of the optically active compound of the present invention is added to a nematic liquid crystal as a base liquid crystal, the thus obtained composition may undergo crystallization at room temperature depending upon a combination thereof. However, the crystallization can be easily avoided by using other chiral dopant in combination.

When the optically active compound of the present invention is used as a chiral dopant, the amount of the optically active compound based on a composition containing the optically active compound is generally 0.1 to 30% by weight, preferably 0.1 to 20% by weight. The above amount is suitably determined by taking account of the value of helical twisting power (HTP) of the optically active compound, the value of birefringence (Δn) thereof, the crystallinity thereof and a type of a nematic liquid crystal.

Effect of the Invention

According to the present invention, there is provided a chiral dopant having properties that its helical twisting power (HTP) is large, that a pitch induced by the dopant decreases with an increase in temperature and that its birefringence is large. The helical pitch of liquid crystals used in TN mode and STN mode can be adjusted by adding a small amount of the chiral dopant of the present invention, so that the deterioration of a base liquid crystal in performances can be suppressed. In a liquid crystal used in SR mode, a chiral dopant that induces a plus wavelength shift is used in combination with the chiral dopant of the present invention, whereby a liquid crystal free of a change in helical pitch depending upon temperatures can be obtained. Further, a chiral dopant having a small birefringence is used in combination with the chiral dopant of the present invention, whereby a liquid crystal having an optimum birefringence can be obtained.

EXAMPLES

The present invention will be further specifically explained with reference to Examples and Comparative Examples hereinafter, while the present invention shall not be limited thereto.

Raw Material Synthesis 1; Synthesis of p-ethynylbezoic acid-(R)-3-ethyl-1-methylpentyl ester (structural formula: $(C_2H_5)_2CHCH_2C^*H(CH_3)OOC-Ph-C\equiv CH$ (in which —Ph— is a 1,4-phenylene group))

(1) Synthesis of p-iodobenzoyl Chloride

An eggplant type flask was charged with 46.2 g of p-iodobenzoic acid and 1,000 mL (milliliters) of thionyl chloride, and the p-iodobenzoic acid was dissolved. Then, the mixture was refluxed under heat for 3 hours. Thionyl chloride was distilled off under reduced pressure, to give 49.6 g of an end compound (crude product yield 100%).

(2) Synthesis of p-iodobenzoic Acid-(R)-3-ethyl-1-methylpentyl Ester

An eggplant type flask was charged with 47.4 g of p-iodobenzoyl chloride, 19.3 g of (R)-4-ethylyl-2-hexanol and 200 mL of dichloromethane, and these were dissolved. To the solution was added 20.0 mL of pyridine, and the mixture was stirred at room temperature for 1 day.

To the resultant reaction mixture was added 200 mL of water, and the mixture was stirred for 30 minutes and them separated into an organic layer and an aqueous layer.

The organic layer was washed with 2N hydrochloric acid, with a 1N sodium hydroxide aqueous solution and with water, and dried over anhydrous magnesium sulfate. The solvent was distilled off from the organic layer under reduced pressure, to give 48.4 g of an end compound (crude product yield 90.5%).

(3) Synthesis of p-(2-hydroxymethylethynyl)benzoic Acid-(R)-3-ethyl-1-methylpentyl Ester A schlenk tube was charged with 62.5 mg of dichloro-bistriphenylphosphine palladium (II) complex and 45.5 mg of copper (I) iodide, and an atmosphere in the system was replaced with nitrogen. 31.9 Grams of p-iodobenzoic acid-(R)-3-ethyl-1-methylpentyl ester and 7.50 g of 2-propyn-1-ol were dissolved in 100 mL of dry triethylamine, and the mixture was charged into the above schlenk tube and stirred at room temperature for 1 day.

Triethylamine was distilled off from the reaction mixture under reduced pressure, and the resultant solid was dissolved in 100 mL of dichloromethane. The resultant solution was washed with 2N hydrochloric acid and with water, and an organic layer was dried over anhydrous magnesium sulfate. The solvent was distilled off under reduced pressure, to give 24.9 g of an end compound (crude product yield 97.5%).

(4) Synthesis of p-ethynylbenzoic Acid-(R)-3-ethyl-1-methylpentyl Ester

An eggplant type flask was charged with 24.9 g of p-(2-hydroxymethylethynyl) benzoic acid-(R)-3-ethyl-1-methylpentyl ester and 600 mL of toluene, and these were dissolved.

To the resultant solution was added 150.0 g of manganese (IV) oxide, and the mixture was stirred at room temperature for 4 days.

The reaction mixture was filtered with cerite, 7.85 g of potassium hydroxide was added to a filtrate, and further, the mixture was stirred at room temperature for 1 day.

The reaction mixture was washed with 2N hydrochloric acid and with water, and an organic layer was dried over anhydrous magnesium sulfate. The solvent was distilled off under reduced pressure, and the resultant crude product was purified by column chromatography, to give 12.65 g of an end compound (yield 56.7%).

Raw Material Synthesis 2; Synthesis of p-Ethynylbenzoic acid-(R)-1-methyloctyl ester (structural formula: $C_7H_{15}C^*H(CH_3)OOC-Ph-C\equiv CH$), p-Ethynylbenzoic acid-(R)-1-methylhexyl ester (structural formula: $C_5H_{11}C^*H(CH_3)OOC-Ph-C\equiv CH$), and p-Ethynylbenzoic acid-(R)-α-methylbenzyl ester (structural formula: $C_6H_5C^*H(CH_3)OOC-Ph-C\equiv CH$)

End compounds were obtained in the same manner as in Raw Material Synthesis 1 except that (R)-4-ethyl-2-hexanol used in Raw Material Synthesis 1 was replaced with (R)-2-nonanol, (R)-2-heptanol or (R)-1-phenylethanol.

Example 1

(Formula (1): $R_1=R_2=(C_2H_5)_2CHCH_2C^*H(CH_3)OOC-$, $A=-C\equiv C-$ (E1)), Preparation of 1,4-bis(4-(R)-3-ethyl-1-methylpentyloxycarbonylphenylethynyl)benzene A schlenk tube was charged with 3.9 mg of a dichloro-bistriphenylphosphine palladium (II) complex and 2.7 mg of copper (I) iodide, and an atmosphere in the system was replaced with nitrogen. 9.18 Grams of p-ethynylbenzoic acid-(R)-3-ethyl-1-methylpentyl ester and 5.80 g of p-diiodobenzene were dissolved in 100 mL of dry triethylamine, and the mixture was placed in the above schlenk tube. The mixture was stirred at room temperature for 1 day.

Triethylamine was distilled off under reduced pressure, and the resultant solid was dissolved in 60 mL of dichloromethane. The resultant solution was washed with 2N hydrochloric acid and with water, and an organic layer was dried over anhydrous magnesium sulfate.

The solvent was distilled off under reduced pressure, and the resultant crude product was purified by column chromatography to give 9.04 g of an end compound in the form of a yellow solid (yield 82%).

Examples 2 and 3

(Formula (1): $R_1=R_2=H_{15}C_7C^*H(CH_3)OOC—$, $A=C\equiv C—$ (E2)), Preparation of 1,4-bis(4-(R)-1-methyloctyloxycarbonylphenylethynyl)benzene, and (Formula (1): $R_1=R_2=H_{11}C_5C^*H(CH_3)OOC—$, $A=C\equiv C—$ (E3)), Preparation of 1,4-bis(4-(R)-1-methylhexyloxycarbonylphenylethynyl)-benzene End compounds were obtained in the same manner as in Example 1 except that the p-ethynylbenzoic acid-(R)-3-ethyl-1-methylpentyl ester used in Example 1 was replaced with p-ethynylbenzoic acid-(R)-1-methyloctyl ester or p-ethynylbenzoic acid-(R)-1-methylhexyl ester.

Example 4

(Formula (1): $R_1=(C_2H_5)_2CHCH_2C^*H(CH_3)OOC—$, $A=C\equiv C—$, $R_2=C_6H_5—C^*H(CH_3)OOC—$ (E4)), Preparation of 1-(4-(R)-3-ethyl-1-methylpentyloxycarbonylphenylethynyl)-4-(4-(R)-α-methylbenzyloxycarbonylphenylethynyl)benzene (1) Synthesis of 4-iodophenyl-4'-(R)α-methylbenzyloxycarbonylthran A schlenk tube was charged with 10.3 mg of a dichlorobistriphenylphosphine palladium (II) complex and 5.9 mg of copper (I) iodide, and an atmosphere in the system was replaced with nitrogen. 2.94 Grams (0.012 mol) of p-ethynylbenzoic acid-(R)-α-methylbenzyl ester and 3.88 g (0.012 mol) of p-diiodobenzene were dissolved in 40 mL of dry triethylamine, and the resultant solution was placed in the above schlenk tube. The mixture was stirred at room temperature for 1 day.

Triethylamine was distilled off under reduced pressure, and the resultant solid was dissolved in 60 mL of dichloromethane. The resultant solution was washed with 2N hydrochloric acid and with water, and an organic layer was dried over anhydrous magnesium sulfate. The solvent was distilled off under reduced pressure, to give 5.57 g of a crude product. The crude product was purified by column chromatography, to give 1.89 g of an end compound (yield 35%).
(2) Synthesis of 1-(4-(R)-3-ethyl-1-methylpentyloxycarbonylphenylethynyl)-4-(4-(R)-α-methylbenzyloxycarbonylphenylethynyl)benzene A schlenk tube was charged with 1.8 mg of dichlorobistriphenylphosphine palladium (II) complex and 1.2 mg of copper (I) iodide, and an atmosphere in the system was replaced with nitrogen. 0.94 Gram (0.0021 mol) of 4-iodophenyl-4'-(R)-α-methylbenzyloxycarbonylthran and 0.54 g (0.0021 mol) of p-ethynylbenzoic acid-(R)-3-ethyl-1-methylpentyl ester were dissolved in mixed solvents of 30 ml of dry triethylamine and 10 ml of dry toluene, and the resultant solution was placed in the schlenk tube. The mixture was stirred at room temperature for 1 day.

Solvents containing triethylamine were distilled off under reduced pressure, and the resultant solid was dissolved in 60 mL of dichloromethane. The resultant solution was washed with 2N hydrochloric acid and with water, and an organic layer was dried over anhydrous magnesium sulfate. The solvent was distilled off under reduced pressure, to give 1.24 g of a crude product. The crude product was purified by column chromatography, to give 0.74 g of an end compound (yield 61%).

Examples 5 and 6

(Formula (1): $R_1=C_5H_{11}C^*H(CH_3)OOC—$, $A=—C\equiv C—$, $R_2=C_6H_5—C^*H(CH_3)OOC—$ (E5)), Preparation of 1-(4-(R)-1-methylhexyloxycarbonylphenylethynyl)-4-(4-(R)-α-methylbenzyloxycarbonylphenylethynyl)benzene, and (Formula (1): $R_1=C_7H_{15}C^*H(CH_3)OOC—$, $A=—C\equiv C—$, $R_2=C_6H_5—C^*H(CH_3)OOC—$ (E6)), Preparation of 1-(4-(R)-1-methyloctyloxycarbonylphenylethynyl)-4-(4-(4R)-α-methylbenzyloxycarbonylphenylethynyl)benzene End compounds are obtained in the same manner as in Example 4 except that the p-ethynylbenzoic acid-(R)-3-ethyl-1-methylpentyl ester used in (2) of Example 4 was replaced with p-ethynylbenzoic acid-(R)-1-methylhexyl ester or p-ethynylbenzoic acid-(R)-1-methyloctyl ester. Example 7 (Formula (1): $R_1=R_2=(C_2H_5)_2CHCH_2C^*H(CH_3)OOC—$, $A=—COO—$ (E7)), Preparation of 4-(4'-(R)-1-methyl-3-ethylpentyloxycarbonylphenyl)oxycarbonyl-4'-(R)-3-ethyl-1-methylpentyloxycarbonylthran
(1) Synthesis of p-acetoxybenzoic Acid-(R)-3-ethyl-1-methylpentyl Ester An eggplant type flask was charged with 3.55 g of p-acetoxybenzoyl chloride, 2.12 g of (R)-4-ethyl-2-hexanol and 20 mL of dichloromethane, and these were dissolved. To the resultant solution was added 1.60 mL of pyridine, and the mixture was stirred at room temperature for 1 day.

To the resultant reaction mixture was added 20 mL of water, and the mixture was stirred for 30 minutes and then separated into an organic layer and an aqueous layer.

The organic layer was washed with 2N hydrochloric acid, with a 1N sodium hydroxide aqueous solution and with water, and the organic layer was dried over anhydrous magnesium sulfate. The solvent was distilled off under reduced pressure, to give 4.77 g of an end compound (crude product yield 100%).
(2) Synthesis of p-hydroxybenzoic Acid-(R)-3-ethyl-1-methylpentyl Ester An eggplant type flask was charged with 4.77 g of p-acetoxybenzoic acid-(R)-3-ethyl-1-methylpentyl ester and 20 mL of toluene, and these were dissolved. To the resultant solution was added 5.20 g of a solution of 40 wt % methylamine in methanol, and the mixture was stirred at room temperature for 1 hour.

To the resultant reaction mixture was added 20 mL of 2N hydrochloric acid, and the mixture was stirred for 30 minutes and then separated into an organic layer and an aqueous layer. The organic layer was washed with water and then dried over anhydrous magnesium sulfate. The solvent was distilled off under reduced pressure, to give 4.08 g of an end compound (crude product yield 100%).

(3) Synthesis of p-iodobenzoic Acid-4'-((R)-3-ethyl-1-methylpentyloxycarbonylphenyl) Ester An eggplant type flask was charged with 2.00 g of p-iodobenzoyl chloride, 1.88 g of p-hydroxybenzoic acid-(R)-1-methyl-3-ethylpentyl ester and 20 mL of dichloromethane, and these were dissolved. To the resultant solution was added 1.00 mL of pyridine, and the mixture was stirred at room temperature for 1 day.

To the resultant reaction mixture was added 20 mL of water, and the mixture was stirred for 30 minutes and then separated into an organic layer and an aqueous layer. The organic layer was washed with 2N hydrochloric acid, with a 1N sodium hydroxide aqueous solution and with water and then dried over anhydrous magnesium sulfate. The solvent was distilled off under reduced pressure, and the resultant crude product was purified by column chromatography to give 2.77 g of an end compound (yield 76.8%).

(4) Synthesis of 4-(4'-(R)-3-ethyl-1-methylpentyloxycarbonylphenyl)oxycarbonyl-4'-(R)-1-methyl-3-ethylpentyloxycarbonylthran A schlenk tube was charged with 2.3 mg of dichlorobis-triphenylphosphine palladium (II) complex and 1.6 mg of copper (I) iodide, and an atmosphere in the system was replaced with nitrogen. 1.59 Grams (0.0033 mol) of p-iodobenzoic acid-4'-((R)-3-ethyl-1-methylpentyloxycarbonylphenyl)ester and 1.29 g of p-ethynylbenzoic acid-(R)-3-ethyl-1-methylpentyl ester were dissolved in 5 mL of dry triethylamine, and the resultant solution was placed in the above schlenk tube. The mixture was stirred at room temperature for 1 day.

Triethylamine was distilled off under reduced pressure, and the resultant solid was dissolved in 20 mL of dichloromethane. The resultant solution was washed with 2N hydrochloric acid and with water, and an organic layer was dried over anhydrous magnesium sulfate. The solvent was distilled off under reduced pressure, to give a crude product. The crude product was purified by column chromatography and re-crystallized from ethanol, to give 1.48 g of an end compound in the form of a yellow solid (yield 83.6%).

Example 8

(Formula (1): $R_1=C_5H_{11}$—, A=—COO—, $R_2$ $(C_2H_5)_2CHCH_2C^*H(CH_3)COO$— (E8)), Preparation of 4-(4'-(R)-3-ethyl-1-methylpentyloxycarbonylphenyl)oxycarbonyl-4'-pentylthran An end compound was obtained in the same manner as in Example 7 except that the p-ethynylbenzoic acid-(R)-3-ethyl-1-methylpentyl ester used in (4) of Example 7 was replaced with 4-pentylphenylacetylene.

Example 9

(Formula (1): $R_1=C_5H_{11}$—, A=—COO—, $R_2=C_7H_{15}C^*H(CH_3)COO$— (E9)), Preparation of 4-(4"-(R)-2-nonyloxycarbonylphenyl)oxycarbonyl-4'-pentylthran (1) Synthesis of p-acetoxybenzoic Acid-(R)-2-nonyl Ester An eggplant type flask was charged with 5.00 g of p-acetoxybenzoyl chloride, 3.00 g of (R)-2-nonanol and 20 mL of dichloromethane, and these were dissolved. To the resultant solution was added 3.00 mL of pyridine, and the mixture was stirred at room temperature for 1 day.

To the reaction mixture was added 20 mL of water, and the mixture was stirred for 30 minutes and separated into an organic layer and an aqueous layer. The organic layer was washed with 2N hydrochloric acid, with a 1N sodium hydroxide aqueous solution and with water, and the organic layer was dried over anhydrous magnesium sulfate. The solvent was distilled off under reduced pressure, to give 6.37 g of an end compound (crude product yield 100%).

(2) Synthesis of p-hydroxybenzoic Acid-(R)-2-nonyl Ester

An eggplant type flask was charged with 6.37 g of p-acetoxybenzoic acid-(R)-2-nonyl ester and 20 mL of toluene, and these were dissolved. To the resultant solution was added 5.20 g of 40 wt % methyl amine in methanol, and the mixture was stirred at room temperature for 1 hour.

To the reaction mixture was added 20 mL of 2N hydrochloric acid, and the mixture was stirred for 30 minutes and then separated into an organic layer and an aqueous layer. The organic layer was washed with water and then dried over anhydrous magnesium sulfate. The solvent was distilled off under reduced pressure, to give 4.80 g of an end compound (crude product yield 87.3%)

(3) Synthesis of p-iodobenzoic Acid-4'-((R)-2-nonyloxycarbonylphenyl)ester

An eggplant type flask was charged with 2.00 g of p-iodobneozyl chloride, 1.98 g of p-hydroxybenzoic acid-(R)-2-nonyl ester and 20 mL of dichloromethane, and these were dissolved. To the resultant solution was added 1.00 mL of pyridine, and the mixture was stirred at room temperature for 1 day.

To the above reaction mixture was added 20 mL of water and the mixture was stirred for 30 minutes and then separated into an organic layer and an aqueous layer. The organic layer was washed with 2N hydrochloric acid, with a 1N sodium hydroxide aqueous solution and with water, and the organic layer was dried over anhydrous magnesium sulfate. The solvent was distilled off under reduced pressure, and the resultant crude product was purified by column chromatography, to give 2.77 g of an end compound (yield 74.9%).

(4) Synthesis of 4-(4'-(R)-2-nonyloxycarbonylphenyl)oxycarbonyl-4'-pentylthran

A schlenk tube was charged with 2.1 mg of dichlorobis-triphenylphosphine palladium (II) complex and 1.5 mg of copper iodide (I), and an atmosphere in the system was replaced with nitrogen. 1.52 Grams (0.0031 mol) of p-iodobenzoic acid-4'-((R)-2-nonyloxycarbonylphenyl)ester and 0.80 g of 4-pentylphenylacetylene were dissolved in 5 mL of dry triethylamine, and the resultant solution was placed in the above schlenk tube. The mixture was stirred at room temperature for 1 day.

Triethylamine was distilled off under reduced pressure, and the resultant solid was dissolved in 20 mL of dichloromethane. The resultant solution was washed with 2N hydrochloric acid and with water, and an organic layer was dried over anhydrous magnesium sulfate. The solvent was distilled off under reduced pressure to give a crude product. The crude product was purified by column chromatography and then re-crystallized from ethanol, to give 1.00 g of an end compound in the form of a colorless solid (yield 61.0%).

Example 10

(Formula (1): $R_1=C_5H_{11}$—, A=—COO—, $R_2=C_5H_{11}C^*H(CH_3)COO$— (E10)), Preparation of 4-(4'-(R)-2-heptyloxycarbonylphenyl)oxycarbonyl-4'-pentylthran An end compound was obtained in the same manner as in Example 9 except that the (R)-2-nonanol used in (1) of Example 9 was replaced with (R)-2-heptanol.

Phase transition temperatures of the optically active compounds (E1 to E10) obtained in the above Examples 1 to 10 were determined by observation through a polarizing microscope and DSC measurement. The DSC measurement was conducted at a temperature decrease rate of 5° C./minute. The results were as shown below.

E1:Iso(59)Cry
E2:Iso(59)Cry
E3:Iso(67)Cry
E4:Iso(57)Cry
E5:Iso(80)Cry
E6:Iso(51)Cry
E7:Iso(<−40)Cry
E8:Iso(98)S(70)Cry
E9:Iso(100)S(66)Cry
E10:Iso(109)S(36)Cry wherein a parenthesized value represents a phase transition temperature (° C.), Iso stands for an isotropic phase, Cry stands for a crystal phase, and S stands for an unidentified smectic phase.

With respect to the optically active compounds (E1 to E10), the common portion of their structural formulae and R portions of the general formula are shown below, and the following Table 1 shows $^1$H-NMR measurement results.

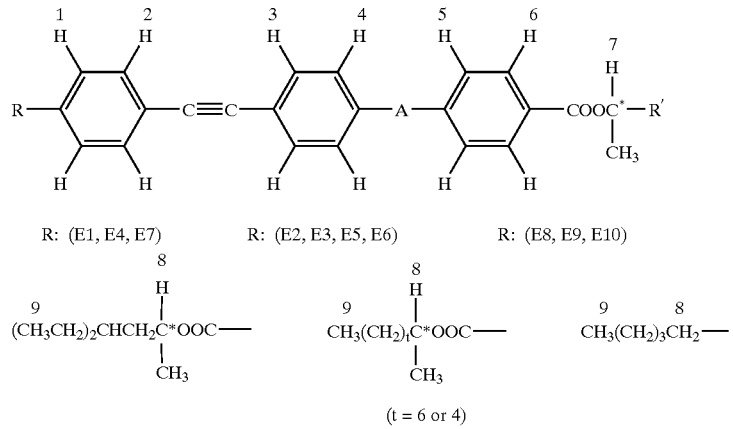

TABLE 1

| | $^1$H-NMR (δ, ppm) | | | | | | | | |
|---|---|---|---|---|---|---|---|---|---|
| | Common portion | | | | | | | R portions | |
| No. | 1 | 2 | 3 | 4 | 5 | 6 | 7 | 8 | 9 |
| (E1) | 8.02 | 7.59 | 7.54 | 7.54 | 7.59 | 8.02 | 5.25 | 5.25 | 0.87 |
| (E2) | 8.02 | 7.58 | 7.54 | 7.54 | 7.58 | 8.02 | 5.16 | 5.16 | 0.88 |
| (E3) | 8.03 | 7.58 | 7.54 | 7.54 | 7.58 | 8.02 | 5.16 | 5.16 | 0.89 |
| (E4) | 8.02 | 7.59 | 7.54 | 7.54 | 7.59 | 8.06 | 6.14 | 5.25 | 0.88 |
| (E5) | 8.03 | 7.59 | 7.54 | 7.54 | 7.59 | 8.06 | 6.14 | 5.16 | 0.89 |
| (E6) | 8.03 | 7.59 | 7.54 | 7.54 | 7.59 | 8.07 | 6.13 | 5.16 | 0.87 |
| (E7) | 7.62 | 8.05 | 7.69 | 8.14 | 7.33 | 8.23 | 5.26 | 5.26 | 0.87 |
| (E8) | 7.19 | 7.48 | 7.65 | 8.12 | 7.31 | 8.17 | 5.25 | 2.63 | 0.90 |
| (E9) | 7.19 | 7.48 | 7.65 | 8.12 | 7.31 | 8.17 | 5.18 | 2.63 | 0.91 |
| (E10) | 7.19 | 7.48 | 7.65 | 8.12 | 7.31 | 8.17 | 5.17 | 2.63 | 0.91 |

Example 11

The optically active compounds (E1 to E10) prepared above were measured for helical twisting powers (HTP), wavelength shifts and birefringence (Δn).

To a nematic liquid crystal (ZLI-1565) supplied by Merck & Co., Inc., was added 15% by weight of the optically active compound (E1) obtained in Example 1, to prepare a chiral nematic (N*) liquid crystal composition.

The thus-prepared liquid crystal composition was measured for an upper limit temperature of its N* phase and selective reflection behaviors, and its helical twisting power (HTP) was determined on the basis of the selective reflection behaviors.

The upper-limit temperature of the N* phase was determined by observation through a polarizing microscope and DSC measurement.

The selective reflection behaviors were measured according to the following procedures.

A liquid crystal cell with ITO electrodes (cell thickness 10 μm) was charged with the above-prepared liquid crystal composition in an isotropic state. The cell was temperature-adjusted to 60° C., a rectangular wave voltage of ±60 V was applied thereto for approximately 1 minute, and the cell was rapidly cooled to room temperature to attain planar alignment.

The above liquid crystal cell was evaluated for selective reflection behaviors at 25° C. and 60° C. with an automatic spectrophotometer. HTPs at 25° C. and 60° C. were calculated on the basis of the following expressions.

HTP $(\mu m^{-1})=n/(\lambda_{25} \times C/100)$

HTP $(\mu m^{-1})=n/(\lambda_{60} \times C/100)$ wherein n is a refractive index of the chiral nematic liquid crystal, $\lambda_{25}$ is a selective reflection wavelength (μm) at 25° C., %60 is a selective reflection wavelength (μm) at 60° C., and C is a concentration (wt %) of the chiral dopant. As a refractive index n, there was employed a value (1.6) that is the refractive index of ZLI-1565 as a base liquid crystal.

The wavelength shift was determined on the basis of the following expression.

Wavelength shift $(nm) = \lambda_{60}^* - \lambda_{25}^*$ wherein $\lambda_{60}^*$ is a selective reflection wavelength (nm) at 60° C. and $\lambda_{25}^*$ is a selective reflection wavelength (nm) at 25° C.

The birefringence (Δn) of each chiral dopant was determined according to the following procedures.

To a nematic liquid crystal ZLI-4718 (Δn=0.08) supplied by Merck & Co., Inc., was added 15% by weight of the optically active compound (E1) obtained in Example 1, to prepare a chiral nematic (N*) liquid crystal composition. The composition was measured for an ordinary light refractive index ($n_o$) and an extraordinary refractive index ($n_e$) at 20° C. with an Abbe's refractometer. Then, a refractive index (n∥) of the liquid crystal composition in the direction of a molecule long axis, a refractive index (n⊥) thereof in the direction of a molecule short axis and a birefringence of the liquid crystal composition were determined on the basis of the following expressions.

$$n\perp = n_e$$

$$n\| = (2n_o^2 - n\perp^2)^{1/2}$$

$$\Delta n = n\| - n\perp$$

Finally, the birefringence of the optically active compound was determined by extrapolation from the birefringence values of the nematic liquid crystal (ZLI-4718) and the above composition. Table 2 shows the results.

The optically active compound (E1) of Example 1 had a large HTP of more than 9 and also had a property that the helix pitch decreased with an increase in temperature. Further, it exhibited a large birefringence of more than 0.16.

The optically active compounds (E2 to E10) obtained in Examples 2 to 10 were evaluated for HTPs, wavelength shifts and birefringence values in the same manner as in the above. Incidentally, with respect to the compounds E3, E4, E5 and E6, compositions containing the nematic liquid crystal and 10 wt % each, based on the nematic liquid crystal, of such compounds were measured for HTPs and wavelength shifts. Table 2 shows the results.

Comparative Examples 1–3

Those known optically active compounds CB15, S811 and CN shown in the explanation of Prior Art were measured for HTPs, wavelength shifts and birefringence in the same manner as in Example 11. For measurement of HTPs and wavelength shifts with respect to CB15 and S811, CB15 and S811 were added in an amount of 15% by weight each on the basis of the nematic liquid crystal to prepare nematic liquid crystal compositions. For measurement of HTPs and wavelength shifts with respect to CN, CN was added in an amount of 30% by weight on the basis of the nematic liquid crystal. Table 2 also shows the results.

TABLE 2

| Compound | Iso-N* (° C.) | HTP (1/µm) | Wave length shift (nm) | Birefringence |
|---|---|---|---|---|
| E1 | 79 | 14.8 | −132 | 0.31 |
| E2 | 80 | 14.0 | −57 | 0.30 |
| E3 | 85* | 13.1 | −93 | 0.32 |
| E4 | 82* | 21.0 | −64 | 0.31 |
| E5 | 84* | 20.3 | −70 | 0.32 |
| E6 | 82* | 20.4 | −47 | 0.30 |
| E7 | 78 | 15.7 | −106 | 0.19 |
| E8 | 88 | 10.1 | −102 | 0.24 |
| E9 | 88 | 9.5 | −23 | 0.25 |
| E10 | 89 | 8.2 | −127 | 0.27 |
| CB15 | 74 | 7.9 | +193 | 0.18 |
| S811 | 73 | 10.1 | +7 | 0.11 |
| CN | 82 | 5.2 | +34 | 0.05 |

Notes)
Iso-N* stands for a phase transition temperature (upper-limit temperature of N* phase) in a transition from an isotropic phase to a chiral nematic phase.
*10 wt % of such a compound was added for evaluations.

What is claimed is:

1. An optically active compound of the following general formula (1),

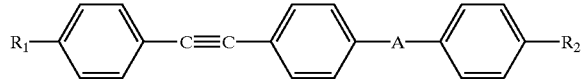

wherein A is —C≡C— or —COO—, each of $R_1$ and $R_2$ is independently $(C_2H_5)_2CHCH_2C*H(CH_3)OOC—$, $C_mH_{2m+1}C*H(CH_3)OOC—$ or $C_6H_5C*H(CH_3)OOC—$ in which, m is an integer of 5 to 9, $C_6H_5—$ is phenyl group, and C* is an asymmetric carbon, provided that there is no case where $R_1$ and $R_2$ are together $C_6H_5C*H(CH_3)OOC—$ and that when both $R_1$ and $R_2$ are $C_mH_{2m+1}C*H(CH_3)OOC—$ m in $C_mH_{2m+1}C*H(CH_3)OOC—$ represented by $R_1$ and m in $C_mH_{2m+1}C*H(CH_3)OOC$ represented by $R_2$ may be different integers.

2. The optically active compound of claim 1, which has a helical twisting power (HTP) of at least 9.

3. The optically active compound of claim 1, which has a property of inducing a helical pitch that decreases with an increase in temperature.

4. The optically active compound of claim 1, which has a birefringence (Δn) of at least 0.16.

5. The optically active compound of claim 1, which has the general formula (1) in which $R_1$ and $R_2$ are together $(C_2H_5)_2CHCH_2C*H(CH_3)OOC$.

6. The optically active compound of claim 1, which has the general formula (1) in which $R_1$ and $R_2$ are together $C_mH_{2m+1}C*H(CH_3)OOC—$.

7. The optically active compound of claim 6, which has the general formula (1) in which A is —C≡C—.

8. The optically active compound of claim 6, which has the general formula (1) in which m in $C_mH_{2m+1}C*H(CH_3)OOC—$ represented by $R_1$ and m in $C_mH_{2m+1}C*H(CH_3)OOC—$ represented y $R_2$ are 5 or 7.

9. The optically active compound of claim 1, which has the general formula (1) in which one of $R_1$ and $R_2$ is $C_6H_5C*H(CH_3)OOC—$ and the other is $(C_2H_5)_2CHCH_2C*H(CH_3)OOC—$ or $C_mH_{2m+1}C*H(CH_3)OOC—$.

10. The optically active compound of claim 9, which has the general formula (1) in which A is —C≡C—.

11. A chiral dopant represented by the general formula (1) recited in claim 1.

12. A nematic liquid crystal composition containing at least one of optically active compounds of the general formula (1) recited in claim 1.

13. A liquid crystal display device having the nematic liquid crystal composition recited in claim 12 interposed between substrates having an electrode each.

* * * * *